US008689829B2

(12) United States Patent
Meikle (10) Patent No.: US 8,689,829 B2
(45) Date of Patent: Apr. 8, 2014

(54) FLUID FLOW MONITOR (75) Inventor: Andrew Stuart Meikle, Pullenvale (AU)

(73) Assignee: Aquatrip Pty Ltd, Pullenvale, Queensland (AU)

( * ) Notice: Subject to any disclaimer, the term of this patent is extended or adjusted under 35 U.S.C. 154(b) by 743 days.

(21) Appl. No.: 11/922,364

(22) PCT Filed: Jun. 14, 2006

(86) PCT No.: PCT/AU2006/000837
§ 371 (c)(1),
(2), (4) Date: Aug. 7, 2009

(87) PCT Pub. No.: WO2006/880851
PCT Pub. Date: Dec. 21, 2006

(65) Prior Publication Data
US 2011/0163249 A1 Jul. 7, 2011

(30) Foreign Application Priority Data
Jun. 15, 2005 (AU) ................................ 2005903100

(51) Int. Cl.
*F16K 31/48* (2006.01)
(52) U.S. Cl.
USPC ................. 137/624.12; 137/487.5; 251/30.02
(58) Field of Classification Search
USPC ............ 137/487.5, 492, 495, 624.11, 624.12, 137/624.18; 251/30.01–30.04
See application file for complete search history.

(56) References Cited

U.S. PATENT DOCUMENTS

| 2,412,490 | A | * | 12/1946 | Biggle | 137/505.12 |
| 3,369,561 | A | * | 2/1968 | Zimmerman et al. | 137/486 |
| 3,940,020 | A | * | 2/1976 | McCrory et al. | 222/52 |
| 3,969,923 | A | * | 7/1976 | Howell | 73/40.5 R |
| 4,249,565 | A | * | 2/1981 | Brust | 137/495 |
| 4,252,088 | A | | 2/1981 | Frisby | |
| 4,425,930 | A | * | 1/1984 | Kruto | 137/1 |
| 4,951,705 | A | * | 8/1990 | Carey et al. | 137/487.5 |
| 5,000,224 | A | * | 3/1991 | Olson et al. | 137/624.12 |
| 5,197,328 | A | * | 3/1993 | Fitzgerald | 73/168 |
| 5,236,578 | A | | 8/1993 | Oleskow et al. | |
| 5,251,653 | A | * | 10/1993 | Tucker et al. | 137/460 |
| 5,503,175 | A | * | 4/1996 | Ravilious et al. | 137/1 |
| 5,568,825 | A | | 10/1996 | Faulk | |
| 5,794,653 | A | | 8/1998 | DeSmet et al. | |

(Continued)

FOREIGN PATENT DOCUMENTS

| GB | 2151383 | 7/1985 |
| GB | 2231697 | 11/1990 |
| GB | 2349199 | 10/2000 |

*Primary Examiner* — Eric Keasel
*Assistant Examiner* — Matthew W Jellett
(74) *Attorney, Agent, or Firm* — Dilworth & Barrese, LLP.

(57) ABSTRACT

A fluid flow monitor, typically for water, includes the combination of a fluid conduit including a magnet displaceable within the conduit when fluid flows therethrough, an electric circuit having a power supply, a magnetic sensor switch positioned in the electric circuit located adjacent to the conduit and positioned at a predetermined distance from the magnet when the magnet is not displaced and a timer connected to the electric circuit. When the magnet is displaced the predetermined distance, the magnetic sensor switch closes the electric circuit activating the timer and when the magnet is not displaced to the predetermined distance, the magnetic sensor switch opens the electric circuit deactivating the timer.

20 Claims, 6 Drawing Sheets

(56) References Cited

U.S. PATENT DOCUMENTS

| | | | |
|---|---|---|---|
| 5,913,236 A * | 6/1999 | Wodeslavsky | 73/40 |
| 6,189,563 B1 * | 2/2001 | Taylor | 137/487.5 |
| 6,532,979 B1 | 3/2003 | Richter | |
| 6,584,999 B2 * | 7/2003 | Inayama et al. | 137/487.5 |
| 6,830,061 B2 * | 12/2004 | Adams et al. | 137/12 |
| 6,832,625 B2 * | 12/2004 | Ford | 137/495 |
| 7,789,102 B2 * | 9/2010 | Beckman | 137/492.5 |
| 2001/0003286 A1 * | 6/2001 | Philippbar et al. | 137/624.12 |

* cited by examiner

FLUID FLOW MONITOR

FIELD OF THE INVENTION

The present invention relates to a fluid flow monitor, and in particular to a timer-controlled fluid flow monitor with a shut-off valve that can be utilized to monitor and control usage of fluids and/or leaks within a fluid supply system.

DESCRIPTION OF THE PRIOR ART

Water is one of the most valuable resources on the planet, so it is imperative to have means and techniques which assist and prevent wastage of this precious commodity. Though wastage can occur in a number of places, one of the largest contributors to this problem is unknown leaks in pipes or inefficient plumbing, such as dripping taps. These problems may appear small, but over a long period of time it leads to copious amounts of water being wasted. In addition, burst pipes or taps being accidentally left on are also a considerable problem, especially gone unnoticed.

One current system that monitors water and provides a shut-off system for excessive water flow is the FloLogic® system which is a motor-driven ball valve installed in a main water line after it enters the house. It enables a user to program whether to monitor water flow differences if you are at home or away. For example, the "home" mode is programmed to allow about 30 minutes of water supply before shutting off the water supply. If an owner is "away" then the system may only allow about 30 seconds of water supply. It only monitors for sudden or accidental water loss inside a building.

U.S. Pat. No. 6,532,979 describes a water supply interruption system comprising a remotely controllable shut-off valve. The water supply is interrupted when the user physically flips a switch when leaving the building or when a timer controls the shut-off valve which is programmed to shut off the water at certain time periods such as when the user is sleeping or is at work. There is no water flow sensor.

U.S. Pat. No. 5,568,825 describes an automatic leak detection and shutoff system which generally comprises a shut off valve and pressure operated check-valve positioned within the main water supply line. A by-pass conduit from the main water supply includes a flow sensor device which is used in conjunction with the pressure operated check-valve. Normal water demand opens the check-valve due to the build up of pressure. When there is no water demand then the check-valve remains closed as the small leakage amount will be insufficient to open the check-valve which can be detected by the sensor shutting off the inflow of water. This system only monitors the detection of leaks and does not monitor normal water usage in a household as the check-valve would remain open. It does not monitor if there is any excessive water flow.

Accordingly, there still remains a need to provide an efficient and cost effective monitor that can be utilized to control the usage of water to a property and more particularly to detect if there are any leaks and damage to the water lines into a property or premise.

It would be advantageous to at least substantially ameliorate the disadvantages and shortcomings of the prior art, or at least provide the public with a useful alternative.

SUMMARY OF THE INVENTION

This invention resides broadly in a fluid flow monitor including,
a fluid conduit including a magnet adapted to be displaced within the conduit when there is fluid flow therethrough,
an electric circuit having a power supply, a magnetic sensor switch positioned in an electric circuit, said switch located adjacent to the conduit, and positioned at a predetermined distance from the magnet when not displaced,
a timer connected to the electric circuit,
wherein when the magnet is displaced the predetermined distance, the magnetic sensor switch closes the electric circuit activating the timer and wherein if the magnet is not displaced to the predetermined distance the magnetic sensor switch opens the electric circuit deactivating the timer.

The fluid flow monitor may be utilized to monitor any liquid or a gas. For example, the monitor of the invention may be used to monitor gas flow into a household generally utilized for cooking, hot water and heating. Preferably the fluid that is being monitored is water.

Preferably, the fluid conduit is made from non-metallic material or material that is non-reactive to magnetic fields. Suitably, the fluid conduit is made from polymer or plastics.

The magnet preferably is a corrosion proof ferrite magnet. The magnet may include a weight to limit the displacement of the magnet to an excessive distance past the predetermined distance and to assist in returning the magnet to a non-displaced position. This weight may be made from brass.

Electric circuits are well known and the power supply may be any suitable AC or DC or alternate power source. The AC power supply may be the mains power source. However, to keep the system simple, efficient and cost effective it is preferable that the power supply is a DC power source, such as a battery.

There are numerous magnetic sensor switches whereby when the magnet moves to the position near the magnetic switch, the switch will operate due to the change of magnetic field and give a switching signal.

Preferably, the magnetic sensor switch is electronically or mechanically operated or a reed switch where there are two overlapping flat contacts. When approached by a magnet the contact ends attract each other making contact. When the magnet is removed, the contacts separate and will immediately disconnect. In use, if there is any fluid flow in the conduit that enables displacement of the magnet to the predetermined position adjacent the reed switch, then the contact ends in the reed switch make contact, completing the electrical circuit that enables the activation of a timer. Once fluid stops flowing in the conduit then the magnet moves away from the reed switch and the circuit is broken thereby deactivating the timer.

The fluid flow monitor may also include a shut-off valve that is able to shut-off flow of fluid in the conduit. It is to be understood that there are many types of shut-off valves available and a person skilled in the art would be able to select alternative types of shut-off valves that will shut-off the fluid flow in the conduit upon activation.

Preferably, the shut-off valve is a solenoid valve.

In general, a solenoid valve consists of a wire coil and a movable plunger and when electrical current is applied to the coil, an actuating magnetic field is created. The resulting magnetic field acts upon the plunger, whose resulting motion actuates the valve which shuts off flow in the conduit. When there is no current, there is no actuating magnetic field which results in the release of the plunger allowing fluid flow through the conduit.

The shut-off valve may also be a latching solenoid valve which includes a magnet whereby when electrical current is applied to the coil, the valve either latches or delatches the plunger depending on the polarity of the magnetic field and the direction of the current flow. When current polarity is reversed, if the plunger is in a latched state, it will be delatched or vice versa. One advantage of a latching solenoid is that only a small electrical pulse is required. This makes it ideal for use with a DC powersource, such as a battery.

Suitably, the shut-off valve is located upstream from or before the magnetic sensor switch. In a preferred embodiment the timer controls the shut-off valve via a control means, all interconnected by the electrical circuit and the power supply. The power supply is a battery, but could be supplied by an AC power source. In use, the timer remains activated while the magnetic sensor switch continues to maintain the electric circuit due to continued fluid usage maintaining the displacement of the magnet to the predetermined distance. Once the timer has been activated continuously for a set period of time then the timer activates the shut-off valve via the control means as fluid flow in the conduit has exceeded the desired time limit. The user would then have to determine why water usage has been exceeded. If the timer is not continuously activated for the preset period of time as the electric circuit is broken due to lack of fluid flow displacing the magnet, then the timer is reset. If there is no fluid flow in the conduit, then the timer will not be activated.

In a preferred embodiment, the fluid flow monitor is a water flow monitor which is connected to a valve, more suitably a diaphragm valve, which is then installed in a water supply where the user desires to monitor water usage. The flow volume of water supply to be monitored is suitably higher than the flow volume in the water flow monitor. The water supply generally is a mains water supply to a property, which can be a domestic, agricultural, commercial property or the like. However, it is to be understood that the water supply may be from a tank, bore or other pumped or gravity fed water supply. The flow monitor may be installed upstream or downstream of any water meter, if there is one present.

In order to detect water usage, the diaphragm valve diverts any water flow from the water supply through the water flow monitor. The water fluid monitor needs to be of a size that is able to detect small levels of water flow, whilst not restricting the volume of water flow.

If there is normal water flow in the water supply then the pressure of the water forces the diaphragm valve open enabling the water supply to continue flowing, but also enables fluid to be diverted into the flow monitor. This in turn displaces the magnet which then triggers the magnetic sensor switch to complete the electric circuit enabling the activation of the timer.

If there is slow water flow in the water supply that is not caused by the user turning on the water supply, the flow is not sufficient to fully open the diaphragm valve. However, even the smallest amount of flow moves through the diaphragm and is directed to the flow monitor, which in turn displaces the magnet triggering the magnetic sensor switch to complete the electric circuit enabling the activation of the timer.

If a battery is used as a power source, the fluid flow monitor will monitor the battery condition. It will alert the user if the power output of the battery falls below the minimum requirement for effective operation of the fluid flow monitor. If this condition occurs, when the fluid flow monitor is next activated by detection of water flow in the conduit, it will close the shut off valve, which will close the diaphragm valve, which will shut off the water supply of the user. When the user next inspects the fluid flow monitor, the user will press the push button on the user interface to reset the fluid flow monitor. When the user has done this a display will advise the user that the battery is falling below its minimum requirement for effective operation of the fluid flow monitor and that that is the cause of activation of the fluid flow monitor.

The timer is able to be programmed by a user to a preset time limit. If water stops flowing into the flow monitor and the preset time limit has not been exceeded, then the timer is deactivated as the magnet is no longer activating the reed switch breaking the electric circuit. The timer is reset by the magnet returning to its resting or non-displaced position.

If the flow of water into the monitor is continuous for a period of time that exceeds the preset time limit then the timer/control means will activate the solenoid valve to shut off fluid flow in the fluid flow monitor. This in turn applies pressure to the diaphragm valve forming a seal closing off the valve and preventing all flow from the fluid supply. The user would then have to check to find out why the water was flowing for an excessive period of time irrespective of whether the flow is normal or slow. For example, excessive water flow could be from a ruptured pipe or a tap being accidentally left on. In contrast, the diversion of water through the sensitive water monitor allows small leaks and faults in the plumbing, dripping taps and the like to be detected.

In another aspect this invention resides in a fluid flow monitor including, a fluid conduit including a magnet adapted to be displaced within the conduit when there is fluid flow therethrough, a magnetic sensor switch positioned in an electric circuit, said switch located adjacent to the conduit, positioned at a predetermined distance from the magnet when not displaced, the electric circuit including a power supply, a timer connected to the electric circuit and a shut-off valve connected to the electric circuit, wherein when the magnet is displaced the predetermined distance the magnetic sensor switch closes the electric circuit activating the timer, wherein the magnet is not displaced to the predetermined distance the magnetic sensor switch opens the electric circuit deactivating the timer and wherein when the timer has been activated for a preset period of time the shut-off valve is activated shutting off the flow of fluid in the conduit.

Preferably, the fluid flow monitor includes a second valve which is adapted to divert fluid from a fluid supply to the fluid conduit of the monitor. The second valve is also adapted to shut off the flow of fluid from the fluid supply when the shut-off valve is activated.

In another aspect this invention resides in a water flow monitor including, a conduit including a magnet adapted to move in the conduit from a resting position to a displaced position with reference to the water flow within the conduit, an electric circuit connected to a battery or alternate power source, a reed switch connected to the electric circuit and located adjacent the conduit at a distance from the resting position of the magnet, a timer with control means connected to the electric circuit, a solenoid shut-off valve connected to the electric circuit, and a diaphragm shut-off valve adapted to divert a water supply to the conduit, wherein when the magnet is displaced due to water flow in the conduit the reed switch activates the electric circuit activating the timer, wherein when the timer has been activated for a preset period of time the control means activates the shut-off valve to shut off the water flow in the conduit, and wherein when water flow is shut off in the conduit the diaphragm valve shuts off the water supply.

Preferably there is manual override means wherein a user may render the fluid flow monitor inoperable.

In a still further aspect, this invention resides in a method of monitoring fluid flow by utilizing the fluid flow monitors as described above in a fluid supply system.

BRIEF DESCRIPTION OF THE DRAWINGS

In order that the present invention may be readily understood and put into practical effect, reference will now be made to the accompanying illustrations wherein.

DETAILED DESCRIPTION OF THE DRAWINGS

In addition terms such as "front", "back", "base", "top", "side", "bottom", "end", "rear", "underside", "height", "distance", "adjacent" etc. refer to the orientation or configuration of a fluid flow monitor when used according to the illustrations and to assist in indicating points of reference when viewing the accompanying figures. It is to be understood that these terms do not limit the present invention to any specific orientation or configuration of the invention.

In the specification the terms "comprising" and "containing" shall be understood to have a broad meaning similar to the term "including" and will be understood to imply the inclusion of a stated integer or step or group of integers or steps but not the exclusion of any other integer or step or group of integers or steps. This definition also applies to variations on the terms "comprising" and "containing" such as "comprise", "comprises", "contain" and "contains".

The term "normal fluid flow" is intended to be indicative of the supply of fluid where there has been some human or mechanical request for the fluid supply resource. For example, this includes a user turning on a tap in a household, a user turning on a gas stove, a programmable timer automatically turning on a sprinkler system, a computer automatically opening a fluid main in an industrial process or the like. It is to be understood that the "normal" is relative depending on the directed usage of fluid supply.

The term "slow fluid flow" is intended to be indicative of the supply of fluid where there has been no human or mechanical or automated request for fluid supply, but fluid continues to flow from the water source. This may be due to a leak or dripping tap.

EXAMPLE 1

Figure 1:
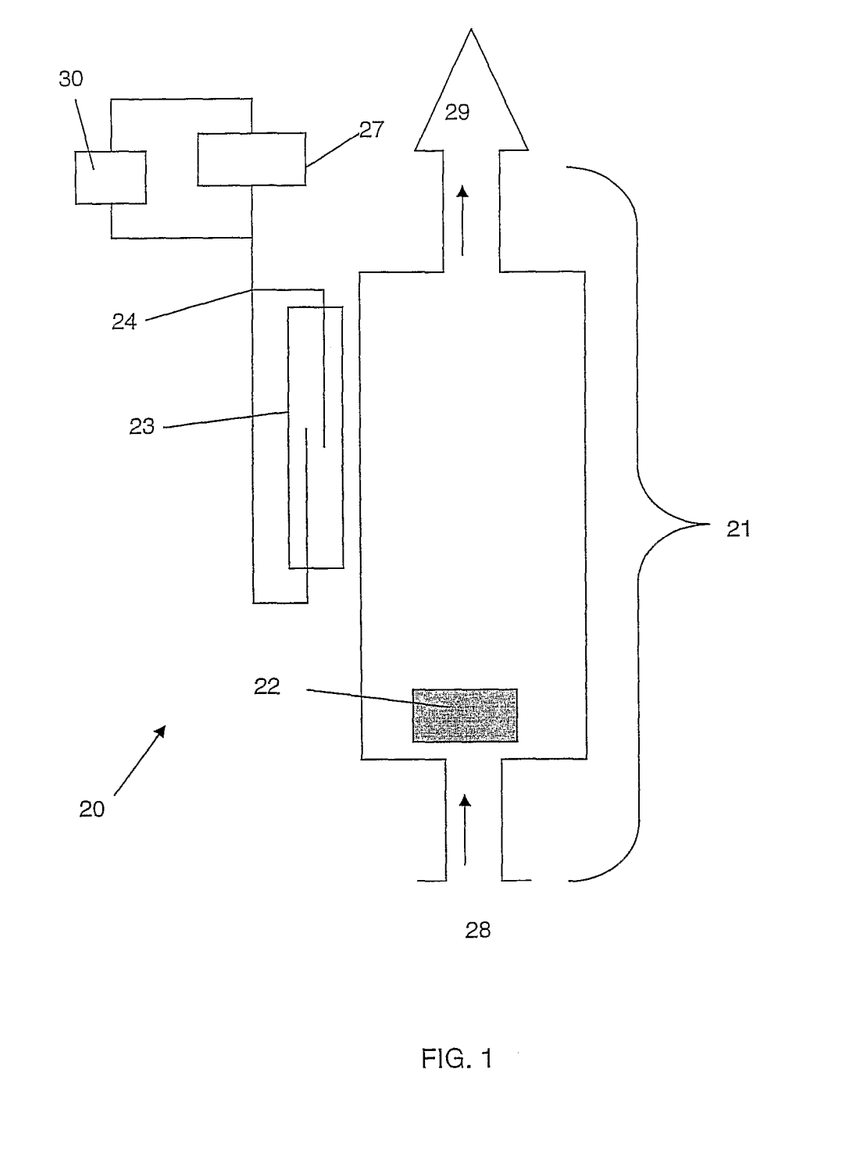
FIG. 1 is a plan view of an embodiment of a fluid flow monitor when there is no fluid flow.
Figure 2:
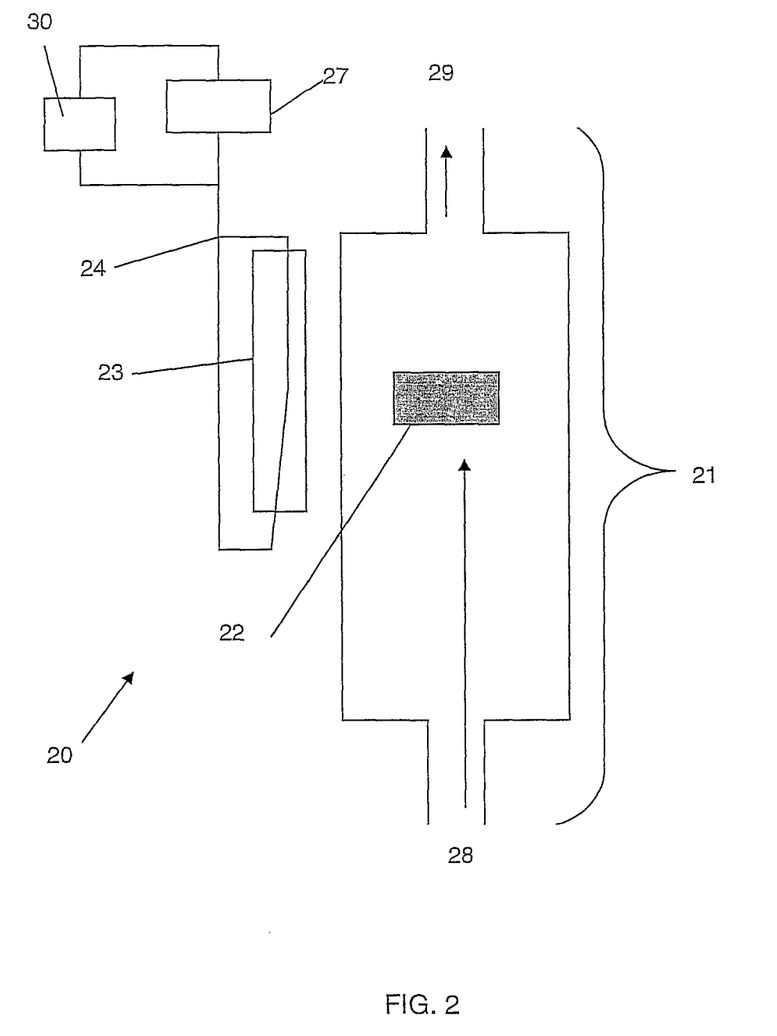
FIG. 2 is a plan view of the embodiment of the fluid flow monitor shown in FIG. 1 when there is fluid flow.

FIGS. 1 and 2 illustrate a fluid flow monitor 20 comprising an elongated fluid conduit 21 having an inlet 28 and an outlet 29. A Magnet 22 is positioned within the conduit 21. A magnetic sensor switch in the form of a reed switch 23 is located adjacent the conduit 21 at a distance from the magnet 22 in a resting position. The reed switch 23 is part of an electric circuit 24 extending to a timer 27. The electric circuit 24 is connected to a power supply 30.

FIG. 1 shows the configuration of the fluid flow monitor 20 when there is no fluid flow through the conduit 21 which is demonstrated by the magnet 28 being located adjacent the inlet 22 in a resting position. FIG. 2 shows the configuration of the monitor 20 when fluid enters the conduit 21 through the inlet 28 which causes the magnet 22 to move from the resting position towards the outlet 29. Once the magnet 22 reaches the level of the reed switch 23, the magnetic field from the magnet 22 causes the contacts of the reed switch 23 to connect closing the electric circuit 24 enabling a current to flow through the circuit 24 from the power supply 30 activating the timer 27.

When fluid flow in the fluid conduit 21 discontinues, the magnet 22 returns to a resting position in the inlet 28 region as indicated in FIG. 1. As the magnet 22 is not in range at this level of the reed switch 23 the contacts are disconnected and the electric circuit 24 is broken deactivating the timer 27.

Preferably, the magnet 22 is a corrosion proof ferrite magnet and could include weights such as brass or other non-magnetic elements which will assist the element to drift down to the bottom of the fluid conduit 21 and to prevent the magnet 22 from travelling too far up the conduit 21. Preferably, the fluid conduit 21 is made from a non-metallic material or non magnetic material such as a typical plastic piping such as rigid plastic PVC (polyvinyl chloride), ABS (acrylonitrile butadiene styrene) and CPVC (chlorinated polyvinyl chloride or other material), which would allow minimal interference with the magnetic sensor and magnetic element.

EXAMPLE 2

Figure 3:
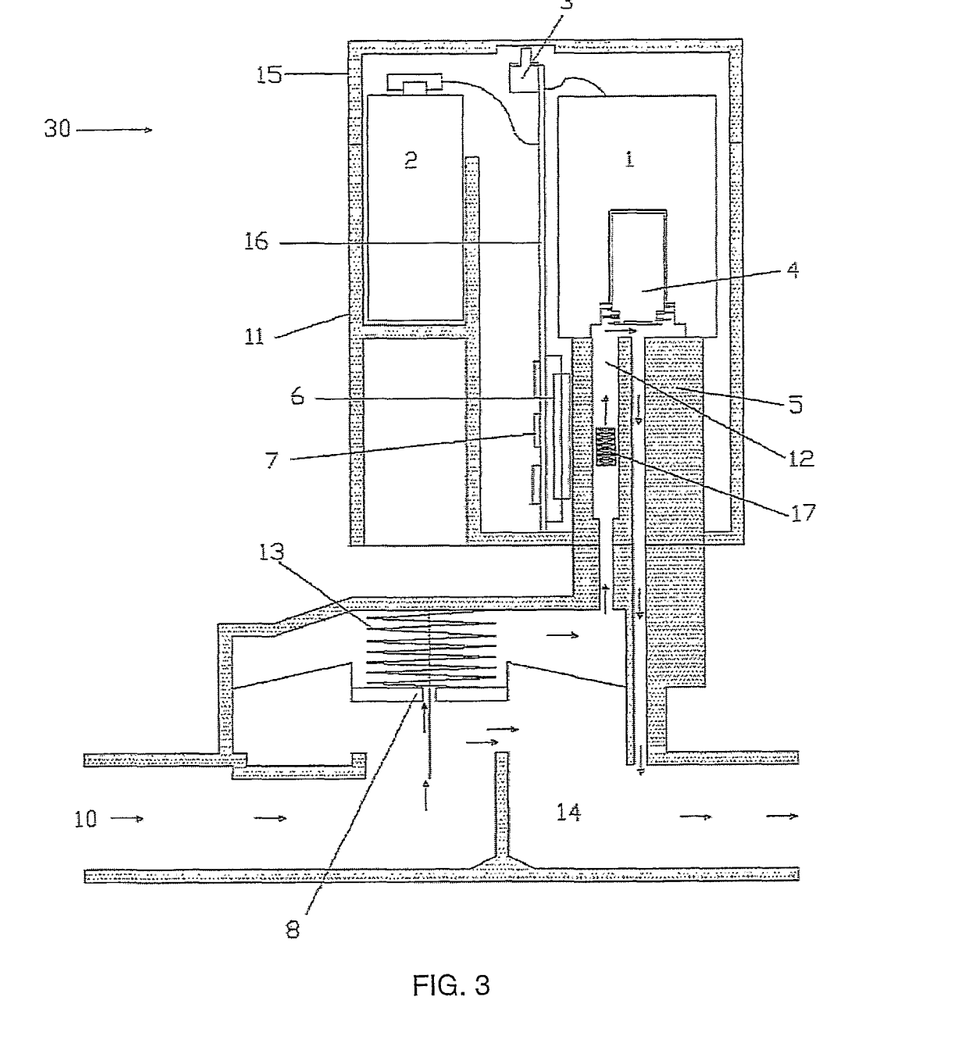
FIG. 3 is a plan view of another embodiment of a fluid flow detector within a fluid system demonstrating normal fluid flow.
Figure 4:
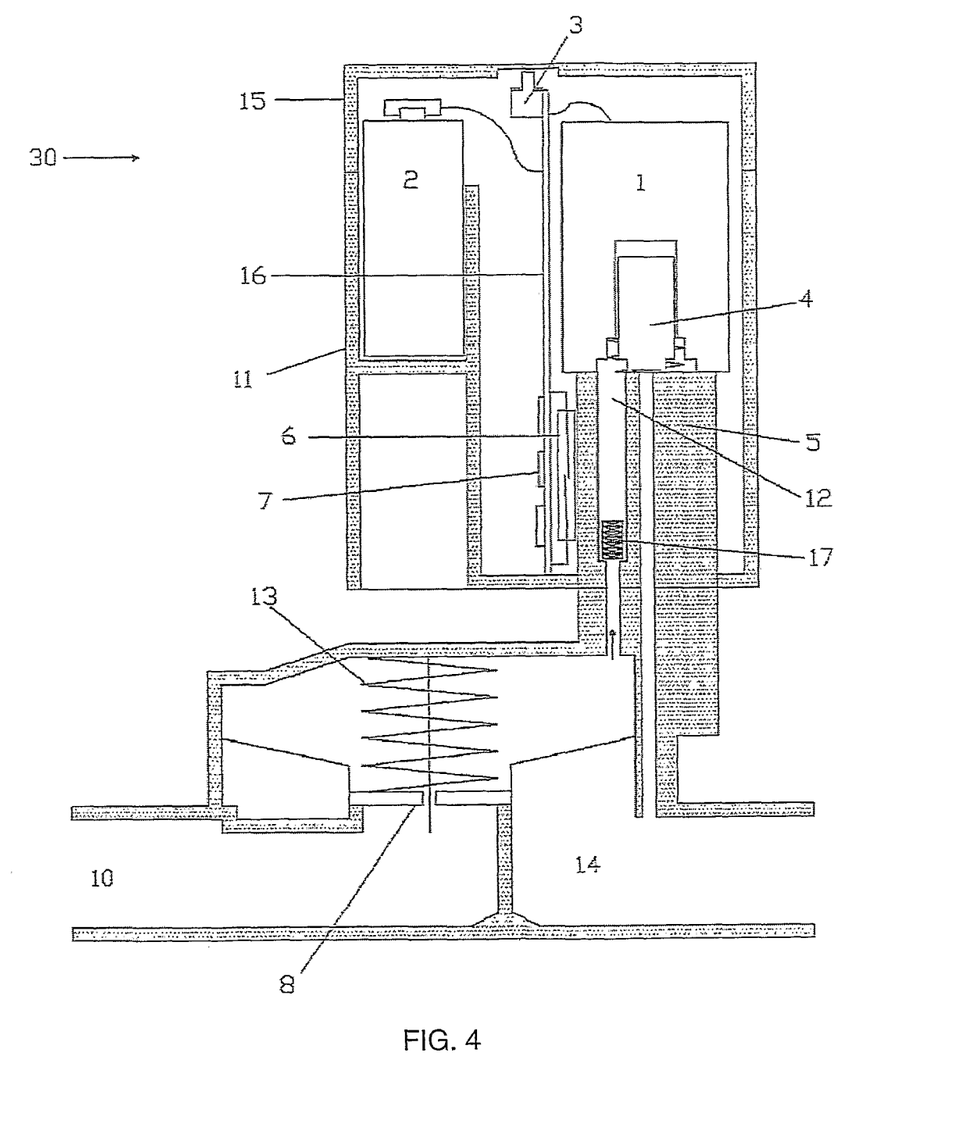
FIG. 4 is a plan view of another embodiment of a fluid flow detector within a fluid system demonstrating no fluid flow.
Figure 5:
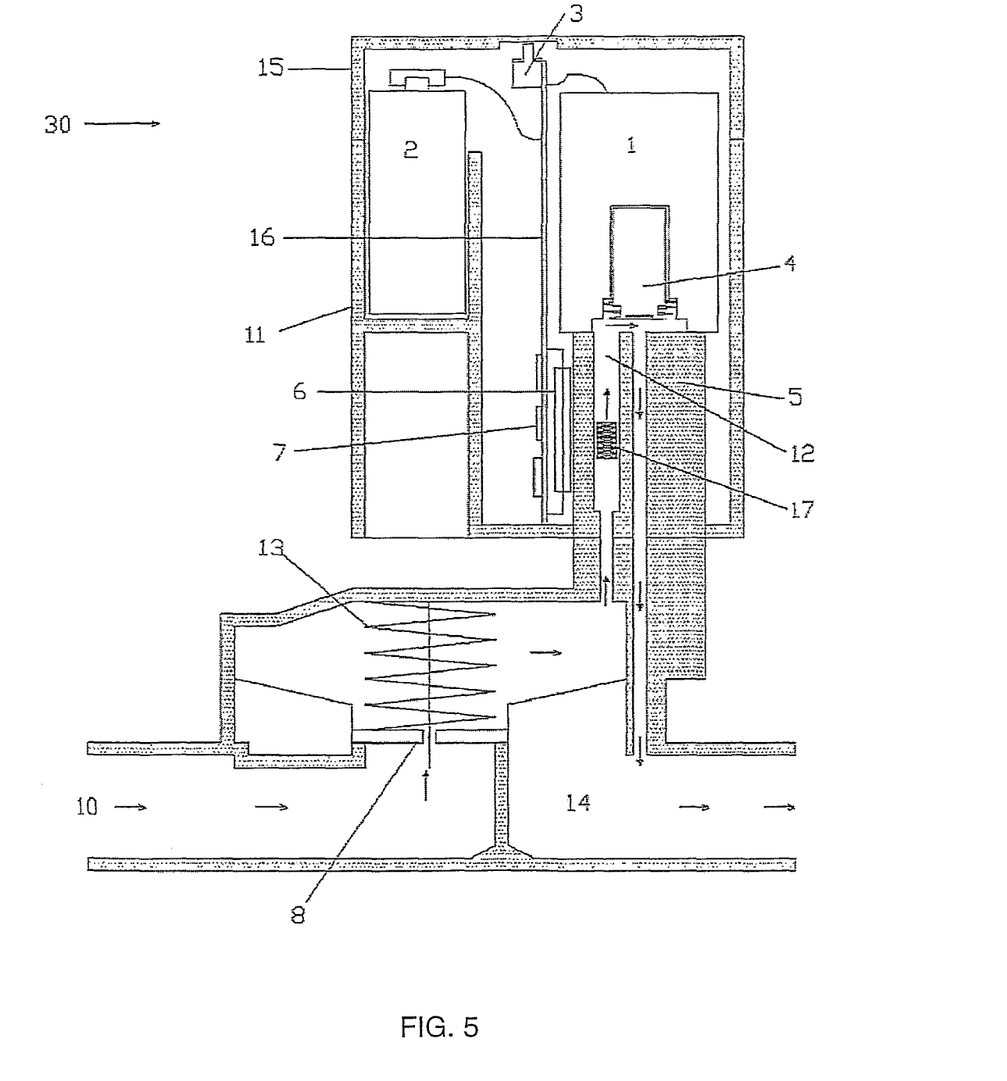
FIG. 5 is a plan view of another embodiment of a fluid flow detector within a fluid system demonstrating slow flow.
Figure 6:
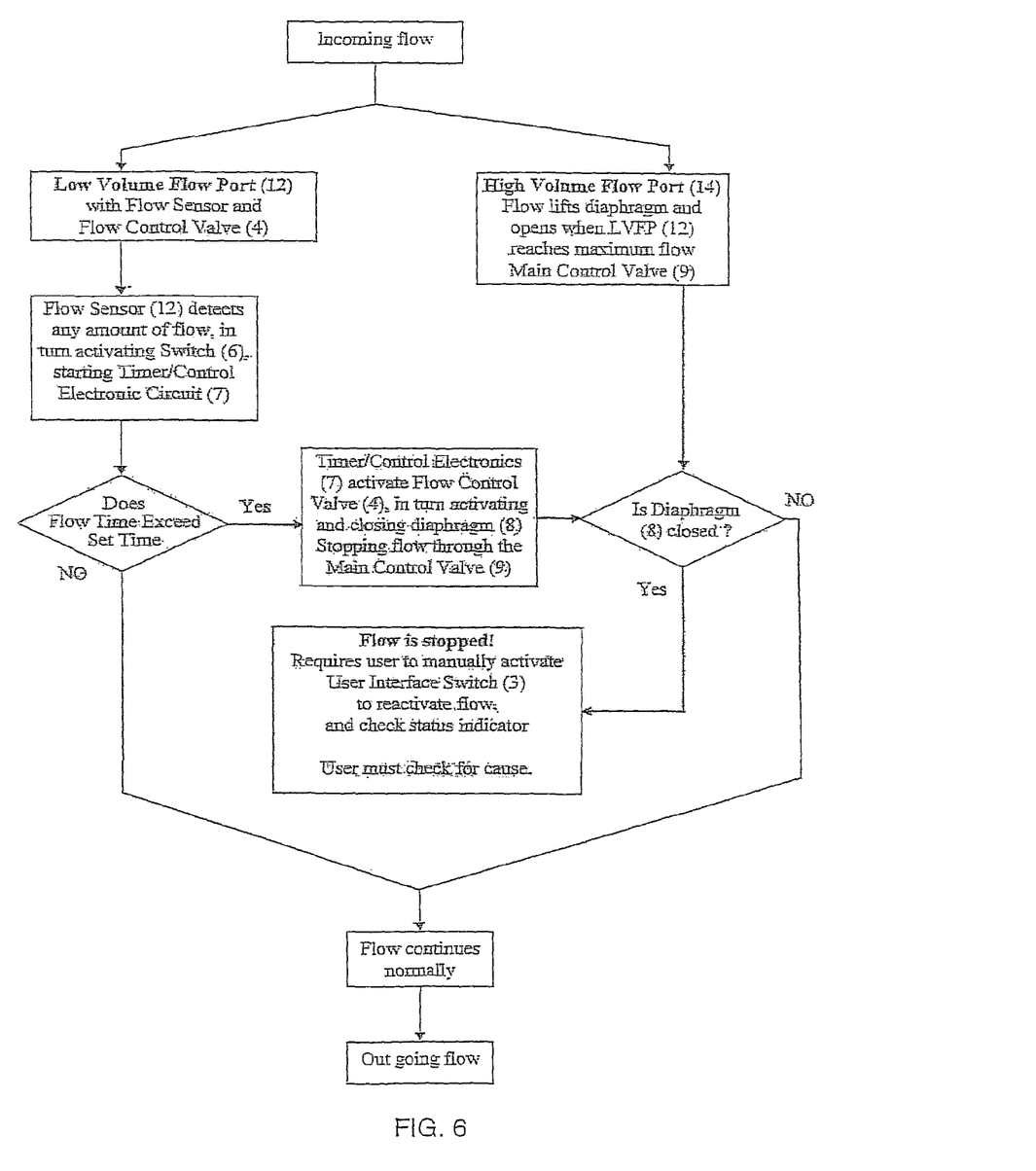
FIG. 6 is a flow chart illustrating a fluid flow detector within a fluid system.

FIGS. 3 to 6 illustrate a second embodiment of a fluid flow monitor 30 according to the invention as described above. In particular these figures illustrate a water flow monitor 30. FIGS. 3 to 5 depict a pictorial illustration of the water flow monitor 30 and FIG. 6 depicts a flow chart of the operation of the water flow monitor 30.

In this embodiment, the water flow monitor 30 may be incorporated into a water supply system such as the main water supply to a household or commercial establishment and is able to shut off the water supply automatically to the property in the event of excessive water flow such as accidental damage to the plumbing or if a tap is left on inadvertently. In addition, it is able to sense slow fluid flow such as may be indicative of a leak or dripping tap. Suitably, the water flow monitor 30 is installed directly after the water meter on the respective property's incoming water supply.

The water flow monitor 30 comprises a diaphragm valve 8,13 comprising a diaphragm 8 and diaphragm spring 13. The diaphragm valve 8,13 is located adjacent a water supply 10 whereby water is diverted to conduit 12 when there is water flow due to pressure on the diaphragm 8. A magnet 17 is located within the conduit 12 and a reed switch 6 is located adjacent the conduit 12. The reed switch 6 is part of an electrical circuit 16 to a timer/control means 7, a battery power supply 2, user interface 3 comprising a switch and display and a solenoid valve 1,4.

The solenoid valve 1,4 comprises an electronic flow switch, solenoid 1 and flow control plunger 4, whereby when an electronic current is passed to the solenoid 1 and an actuating magnetic field activates the plunger 4 to stop the flow of fluid through the conduit 12. Preferably, the solenoid valve 1,4 is a DC latching solenoid.

In order to enable current flow through the electric circuit 16, water flow must occur through the diaphragm valve 13,8 which is diverted through the conduit 12. As shown in FIG. 3, if the flow of the water supply 10 is normal the pressure causes the diaphragm valve 8,13 to open allowing for continued flow through to 14. Water still flows through the diaphragm 8 and is diverted into the water monitor's conduit 12. As shown in FIG. 5, if the flow of the water supply 10 is slow the water pressure is not sufficient to open the diaphragm valve 8,13, but any small amount of flowing water in the water supply 10 moves through the diaphragm 8 and is diverted to the conduit 12. This arrangement ensures that any amount of water flow is monitored and cannot bypass the water flow monitor 30 of the invention.

Water flow into the conduit 12 enables the magnet 17 to become displaced from its resting position in the conduit 12 to come within the proximity of the reed switch 6 which enables the contact points to connect completing the electric circuit 16. Once the electric circuit 16 is closed the timer/control means 7 is powered up activating the timer. Diverted water continues to flow through conduit 12 and is redirected to the normal water supply 14 to the property. When there is no water flow through the diaphragm valve 8, then the magnet 17 is positioned in a resting position at the bottom of the conduit 12 deactivating the reed switch 6 which opens and turns off the electric circuit 16. The break in the circuit powers off the timer 7. Suitably the diaphragm water valve 13,8 is a Richdel type valve, however other types of valves may be used.

The magnet 17 is a non-corrosive ferrite magnet. Suitably, the magnet has a small brass weight above it, which is used to increase the gravitational force to return the magnet 17 to its no-flow resting point. The brass weight also acts to limit the travel of the magnet when the water is flowing.

The solenoid valve 1,4 is preferably fitted on top of the conduit 12. The solenoid 1,4 is controlled via the timer/control means circuit 7,16 to shutoff the water flow in the conduit 12, which in turn halts the main body of water flow through the diaphragm valve 8. The timer/control circuit 7,16 also incorporates a reset which activates the solenoid 1 and turns on water flow in the event of a trip event.

As best illustrated in FIG. 4, if water flow is continuously monitored by the timer 7 and a pre-selected time limit is exceeded by the timer 7, the solenoid valve 1,4 will shutoff the water in the conduit 12 which in turns shuts off the diaphragm valve 8. If the water flow is not continuous and is stopped and started during the selected time, the water supply will not be shut off by the solenoid plunger 4. The timer 7 will be reset and then restarted each time the water flow is started.

For example, if the timer is programmed for one hour then the continuous water flow must not exceed one hour, as that would result in the water being shut off automatically. However, if the water flows for 45 minutes and then is shut off, followed by another 45 minutes of water flow and then shut off, the one hour period will be exceeded, but the water would not be automatically shut off due to the pause in flow. Under normal water use, it would be expected that the water would not run continuously to a property for hours. As long as the water is turned off (no flow) at some point within the one hour, the timer is reset, and is restarted when the water flow resumes.

The timer/control means 7 is preferably provided with a user interface 3 which may be microprocessor controlled. The user interface 3 may be used to enter a program that suits the water requirements of the property. The continuous water flow time can be set by the installer or end user. Suitably, there are a number of preset time choices that can be programmed. Of course, the number and type of options will depend on the type and destination of the water supply.

The user interface 3 suitably has a simple single push button and an LED or LCD or other appropriate display for all functions to be carried out. In the event that the water has automatically been shut off, the user interface 3 can be used to reset the water flow monitor 30 by pressing the reset button.

The timer/control means 7 also includes a one-time override mode that can be easily set via the user interface in the event that the user needs extra, time, e.g. when filling a swimming pool. The override mode is automatically cancelled as soon as the water flow stops, requiring no user input.

The microprocessor and timing circuit features an extremely low power consumption design, ensuring a long battery life. A low battery sensor will automatically shut off the water, forcing the user to check the monitor 30. A low battery indicator flashes on the display of the user interface 3 after the reset button is pushed as an indication that the battery needs replacing. A manual override mode is also selectable in the event that the user has no spare battery on hand making sure that the property will not be left without water.

Under normal domestic and business water use, water flowing continuously indicates that these is either a leak or fault in the plumbing. Typical water use involves many short time periods of water flow (tap on, tap off etc). The water flow monitor will reset every time the flow stops.

In order to provide the necessary sensitivity to detect the smallest leak, the volume of water that is adapted to flow through the conduit 12 is substantially less than the normal volume of the water supply, so as to not compromise the volume of water required to normally flow to a property. We have shown that the water flow monitor can detect a tiny amount of water flow (less than 90 ml per minute being equivalent to a tap dripping rapidly) and also to allow the flow of a large amount of water unrestricted, up to 100 L pm for the standard one inch model, and larger amounts with a bigger, valve fitted. To save on moving parts and simplify the design, the spring loaded diaphragm 13, 8 in the water valve is used as the plunger to divert the water through the flow sensor valve body. This allows for a compact cost effective design.

In addition, the electronic components such as reed switch 6, timer/control means 7, shutoff solenoid valve 1,4 are sealed from the elements via o-ring seals. The water flow monitor 30 is enclosed in a housing 11 and a lid 15 to ensure protection from the environment. The lid 15 enables the easy replacement of any of the components of the monitor 30 and more importantly replacement of the battery 2 when the power supply is low or flat.

Advantageously, the fluid flow monitor 30 of the invention may assist in one or more of the following:

1. Eliminates excess water bills and saves water by minimizing the amount used in the event of: water leaks, burst pipes, taps left switched on, leaking toilet systems, dish washers, washing machines, and irrigation systems.
2. Prevents excessive water damage to property caused by leaking pipes, washing machine, dishwasher, plumbing leaks and blowouts.
3. Encourages the user to repair dripping taps and toilet cisterns that run on.
4. Prevents leaving the hose or sprinkler running when the user has forgotten to switch it off. Another example, may occur when the user is topping up the pool.
5. Gives peace of mind when the user is away from the property, in relation to water leaks and burst pipes.
6. Stops underground water leaks going undetected for long periods.
7. Prevents water wastage and property damage due to vandals turning on taps and leaving them running.
8. Saves wasted water
9. Educates the user in relation to water usage.

It will of course be realized that while the foregoing has been given by way of illustrative example of this invention, all such and other modifications and variations thereto as would be apparent to persons skilled in the art are deemed to fall within the broad scope and ambit of this invention as is herein set forth.

The invention claimed is:

1. A fluid flow monitor including:
   a diverted fluid conduit elevated at an angle from the horizontal, including a magnet adapted to be displaced within the diverted fluid conduit when there is fluid flow therethrough, and to return to a resting position when there is no fluid flow through the diverted fluid conduit, to detect a leak downstream of the fluid flow monitor;
   a first valve located within the diverted fluid conduit and arranged downstream of a second valve;
   the second valve including a hole through its body adapted to divert a small amount of fluid flow from a fluid supply to the diverted fluid conduit when the first valve is open and the second valve is closed;
   an electric circuit including a power supply;
   a magnetic sensor switch, located adjacent the diverted fluid conduit at a predetermined position; and
   a timer;
   wherein when the magnet is displaced to the predetermined position, the magnetic sensor switch closes the electric circuit activating the timer such that if the magnetic sensor switch remains closed for a period of time, the timer closes the first valve which, in turn, closes the second valve to stop a leak downstream of the fluid flow monitor.

2. A fluid flow monitor as claimed in claim 1, wherein the diverted fluid conduit is made from non-metallic material or material that is non-reactive to magnetic fields.

3. A fluid flow monitor as claimed in claim 1, wherein the magnet is a corrosion proof ferrite magnet.

4. A fluid flow monitor as claimed in claim 1, wherein the magnet includes a weight to limit the displacement of the magnet to a distance past the predetermined distance and assist in returning the magnet to the non-displaced position.

5. A fluid flow monitor as claimed in claim 1, wherein the magnetic sensor switch is electronically or mechanically operated.

6. A fluid flow monitor as claimed in claim 5, wherein the magnetic sensor switch is a reed switch.

7. A fluid flow monitor as claimed in claim 1, wherein the first valve is a solenoid valve.

8. A fluid flow monitor as claimed in claim 7, wherein the solenoid valve is a latching solenoid valve which includes a magnet whereby when electrical current is applied to the solenoid coil the valve either latches or delatches the plunger of the solenoid depending on the polarity of the magnetic field and the direction of the current flow.

9. A fluid flow monitor as claimed in claim 7, wherein the timer controls the solenoid valve via a control means.

10. A fluid flow monitor as claimed in claim 1, wherein the second valve is a diaphragm valve.

11. A fluid flow monitor as claimed in claim 10, wherein the diaphragm valve is connected to the fluid supply.

12. A fluid flow monitor as claimed in claim 1, wherein the fluid flow monitor is installed upstream or downstream of a water meter.

13. A fluid flow monitor as claimed in claim 1, of a size that is able to detect a small amount of water flow without restricting the volume of the water flow.

14. A fluid flow monitor as claimed in claim 1, wherein the timer is able to be programmed by a user to a preset time limit.

15. A fluid flow monitor as claimed in claim 14, wherein if water stops flowing into the fluid flow monitor and the preset time limit has not been exceeded, then the timer is deactivated.

16. A fluid flow monitor as claimed in claim 14, wherein the timer is reset by the magnet returning to its resting or non-displaced position.

17. A fluid flow monitor according to claim 1, having
   an electronic override mode that can be set by a user to allow continuous fluid flow through the fluid flow monitor, wherein
   said electronic override is automatically cancelled as soon as the fluid flow stops.

18. A fluid flow monitor as claimed in claim 1, further including a manual override means to enable a user to render the fluid flow monitor inoperable.

19. A fluid flow monitor as claimed in claim 1, wherein a battery is used as a power source and the fluid flow monitor monitors the battery condition to alert the user if the power output of the battery falls below the minimum requirement for effective operation of the fluid flow monitor.

20. A fluid flow monitor as claimed in claim 15 wherein the timer is reset by the magnet returning to its resting or non-displaced position.

* * * * *